United States Patent [19]

White et al.

[11] 4,299,191
[45] Nov. 10, 1981

[54] CHICK CAGE SYSTEM

[75] Inventors: Charles A. White, Woodstock; Eddie L. Holland, Roswell, both of Ga.

[73] Assignee: U.S. Industries, Inc., New York, N.Y.

[21] Appl. No.: 114,221

[22] Filed: Jan. 22, 1980

[51] Int. Cl.³ .............................................. A01K 31/06
[52] U.S. Cl. ......................................... 119/18; 119/17
[58] Field of Search ......................... 119/17, 18, 21, 48

[56] References Cited

U.S. PATENT DOCUMENTS

| | | | |
|---|---|---|---|
| 2,197,160 | 4/1940 | Schuppner | 119/48 |
| 2,264,959 | 12/1941 | Sperry et al. | 119/48 |
| 2,698,004 | 12/1954 | Luther | 119/18 X |
| 3,492,970 | 2/1970 | Keen et al. | 119/18 |
| 3,738,323 | 6/1973 | Boterweg | 119/17 X |

OTHER PUBLICATIONS

"Flat-Deck Chik-Eze" Cage System advertisement brochure of Big Dutchman, Atlanta, Georgia.
"Tri-Deck Chik-Eze" Cage System advertisement brochure of Big Dutchman, Atlanta, Georgia.

Primary Examiner—Paul J. Hirsch
Assistant Examiner—Robert P. Swiatek
Attorney, Agent, or Firm—Price, Heneveld, Huizenga & Cooper

[57] ABSTRACT

A chick cage system particularly adapted for the raising of chicks into pullets including upper and lower cage rows, the upper cage rows overlying the lower cage rows for approximately one-half of their width. The feed trough in the lower cage is offset laterally from beneath the upper cages so as not to be contaminated by falling manure. The upper cages, within which the chicks are started, include a barrier for reducing the size of the cage and a feed saver mechanism swingable with the barrier. The troughs run centrally of the cages to permit bird access thereto from both sides.

13 Claims, 5 Drawing Figures

CHICK CAGE SYSTEM

BACKGROUND OF THE INVENTION

This invention relates to cage systems for the raising of poultry and, more particularly, for the raising of chicks into pullets and the like.

It is customary, particularly in the raising of pullets, to confine the birds within a cage, suitable provisions being made for watering, feeding and manure disposal. The chicks, ordinarily, remain in the cages for approximately twenty weeks, having been debeaked and redistributed at the end of the first ten day period.

Poultry houses of the type wherein pullets are raised are, of course, expensive to construct, and it is highly desirable to utilize space with maximum efficiency. Factors affecting such efficiency, however, include not only bird density but feed and energy efficiency, serviceability, equipment cost, maintenance and the like. Optimally, by combining these and other such factors, a particular group of chicks is reared with maximum efficiency.

Many widely differing types of cage systems have been proposed for the raising of the chicks. These include the present Assignee's FLAT DECK and TRI-DECK CHIK-EZE cage systems. The FLAT DECK system, briefly, consists of a single tier of back-to-back cages suitably suspended above a manure pit or the like. The feed troughs traverse the bottoms of the cage at a central location, a swingable barrier of the general type hereinafter discussed being provided to reduce the cage size during the initial period the birds are contained therein. After this period has passed, the barrier is retracted, permitting the birds to have access to the feed trough from either side thereof.

The FLAT DECK CHIK-EZE system has achieved considerable commercial success and, certainly, its use results in high quality pullets. It is relatively inefficient, however, from a bird density and energy standpoint. There has also been a marked tendency to waste feed during the period prior to debeaking, since the birds tend to push the same through the barrier from whence it drops into the manure pit.

The TRI-DECK CHIK-EZE cage system includes three tiers of aligned rows of cages. The feed troughs are positioned along the front of each of the cages. Complicated scraping mechanisms are required to remove manure from above the lowest and middle tiers of cages. While this system is highly efficient from a bird density standpoint, the facts that the feed is accessible to the birds from only one side of the cage and the significant initial investment and maintenance costs required to maintain it present significant drawbacks.

Cage arrangements other than those discussed above have been utilized. One such arrangement involves the placement of two rows of cages directly over two other rows of cages such that the floors of the top cages form the ceilings of the lower cages. While such a system, again, is quite efficient from a bird density standpoint, the fact that the manure from the birds in the upper cages is constantly falling into the food, etc., in the lower cages makes the system unsatisfactory. Lighting and ventilation problems in the lower cages, along with the difficulty in removing birds therefrom, also markedly detract from the efficacy of this system.

Another prior art proposal has been to laterally offset two bottom rows of cages completely from two adjacent top rows of cages positioned thereabove. Feed troughs, in this system, were placed at the exterior of each cage. While the system has many advantages insofar as lighting, ventilation and the like are concerned, it is bad from bird density and food accessibility standpoints.

Another problem which is encountered with cage systems of the type described is the tendency of the birds to spill feed from the trough. This has been remedied in the TRI-DECK CHIK-EZE cage and cages similar thereto by the provision of a permanent metal feed guard extending from the outer extremity of the feed trough up the front of the cage. This guard prevents birds from knocking food out of and over the trough into the aisleway when eating. The use of such a guard, however, has been limited to cages having the feed troughs on one side thereof. While the guard in these cages has served to retard food spillage, the fact that the feed trough is on the exterior of the cage prevents optimal feeding access which is obtained only when the trough is in the center of the cage and accessible by birds confined on either side of it.

SUMMARY OF THE INVENTION

The poultry cage system, constructed in accordance with the teachings of a first aspect of this invention, comprises first and second upper rows of cages extending generally parallel to and positioned adjacent one another in back-to-back fashion. First and second lower rows of cages are positioned beneath and extend generally parallel to the upper rows of cages, the lower cages being spaced from one another, each underlying one of the upper rows of cages for approximately one-half of its width, leaving the top of the other half of each of the lower rows of cages substantially unobstructed. A feed trough is positioned within and extends lengthwise of each of the lower rows of cages. These troughs are offset laterally from the upper rows of cages but positioned generally centrally within the lower rows of cages such that droppings from the upper rows of cages will not fall into the feed troughs, but birds may feed from either side thereof.

A poultry cage fabricated in accordance with another aspect of this invention, separate from or in combination with the aspect described in the preceding paragraph, includes a cage having a feed trough extending along the bottom and spaced from either side thereof. A barrier is provided within the cage, movable between a first position whereat the interior of the cage is substantially unobstructed and poultry contained therein are free to move throughout the entire cage, and a second position whereat the interior of the cage is divided into two sections. The barrier in the second position confines poultry contained within the cage to one side thereof. A substantially imperforate feed saver depends from the one edge of the barrier and means interconnect the opposite edge of the barrier with the top of the cage such that the same may be moved between the first and second positions. The feed saver, when the barrier is in the second position, abuts one side of the feed trough and extends upwardly therefrom to retard the spillage of food contained in the trough over the one side thereof.

DETAILED DESCRIPTION OF THE PREFERRED EMBODIMENT

Figure 1:
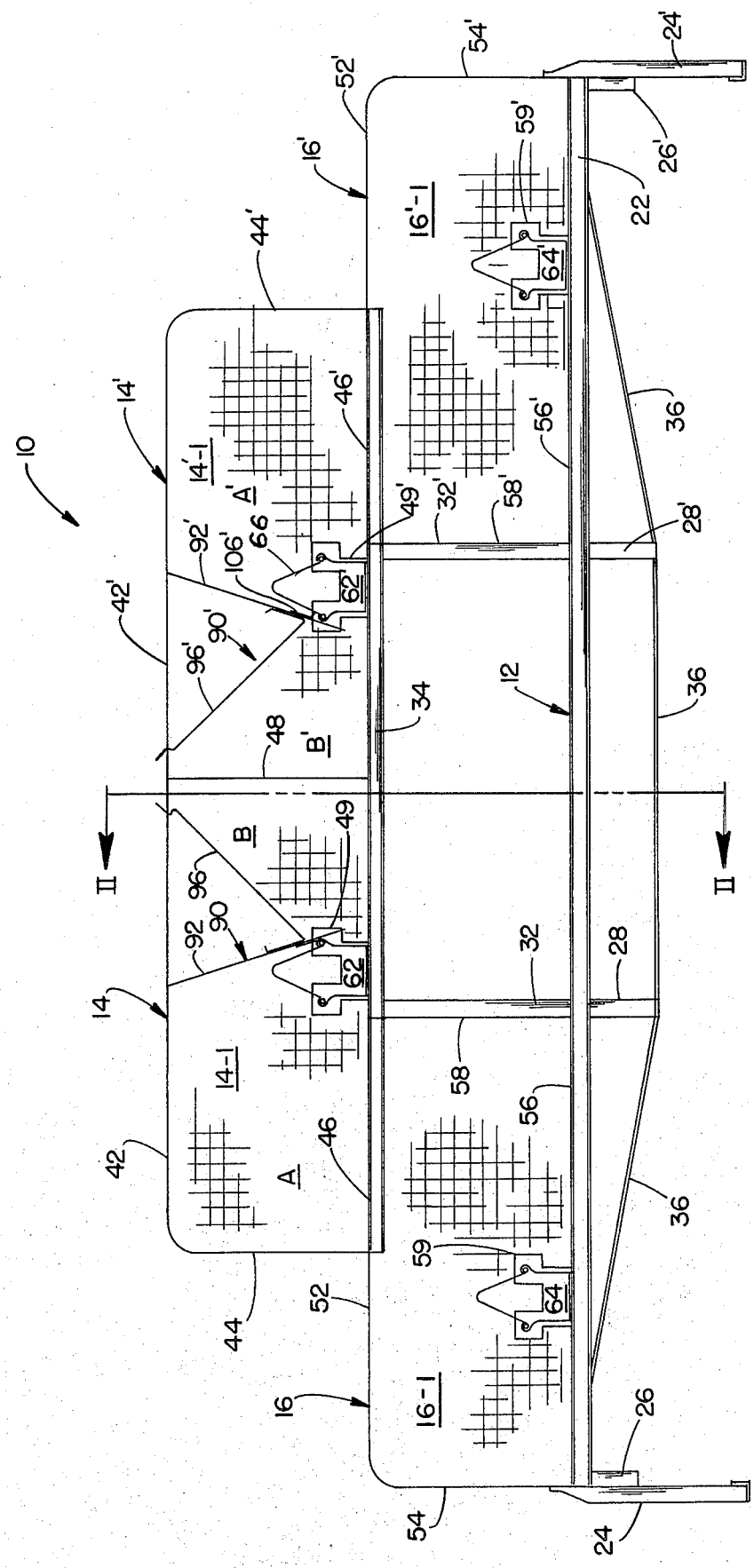
FIG. 1 is an end elevation of the chick cage system which is the subject of this invention.
Figure 2:
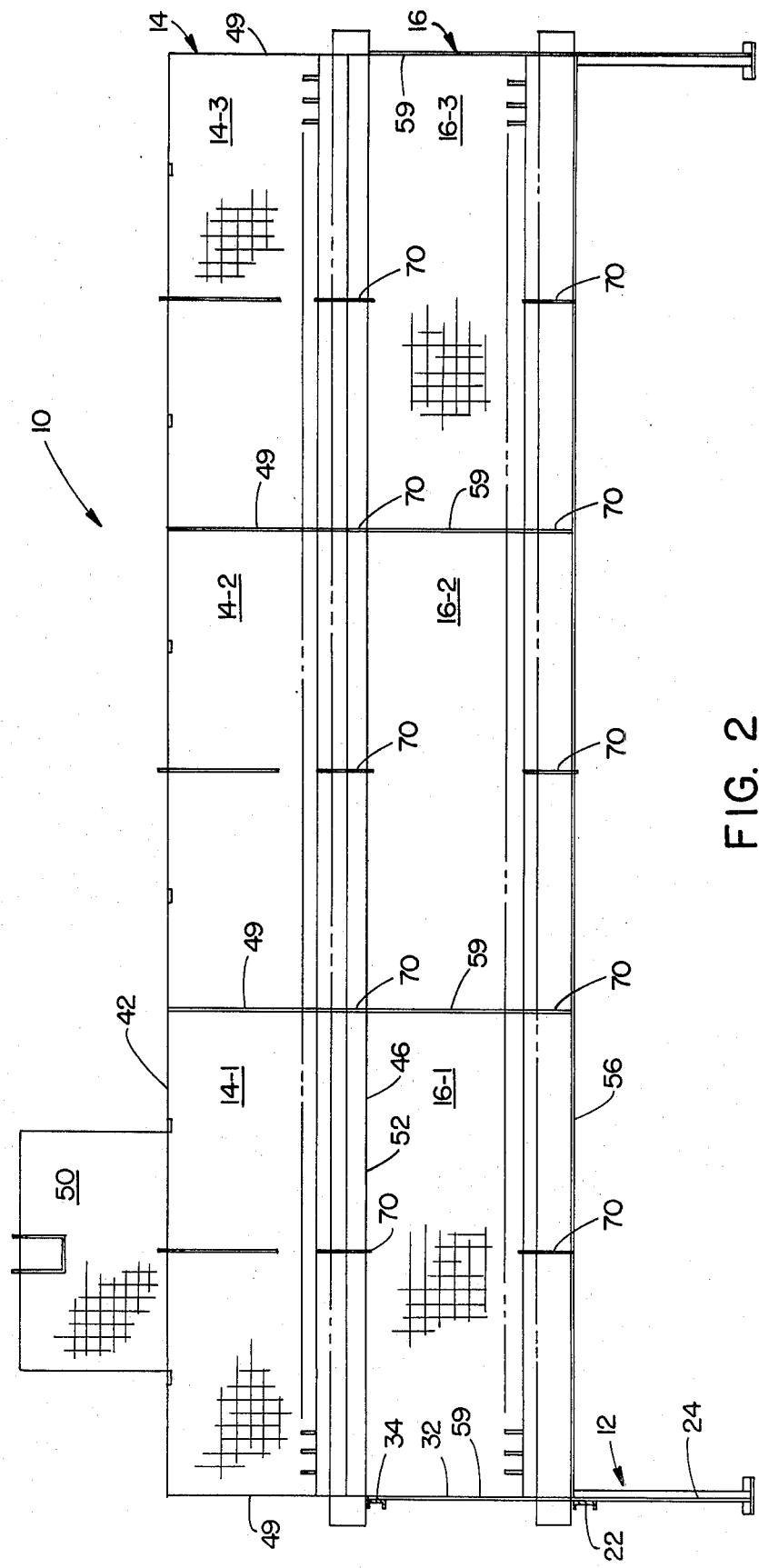
FIG. 2 is a schematic, cross-sectional view taken along the plane II—II of FIG. 1.
Figure 3:
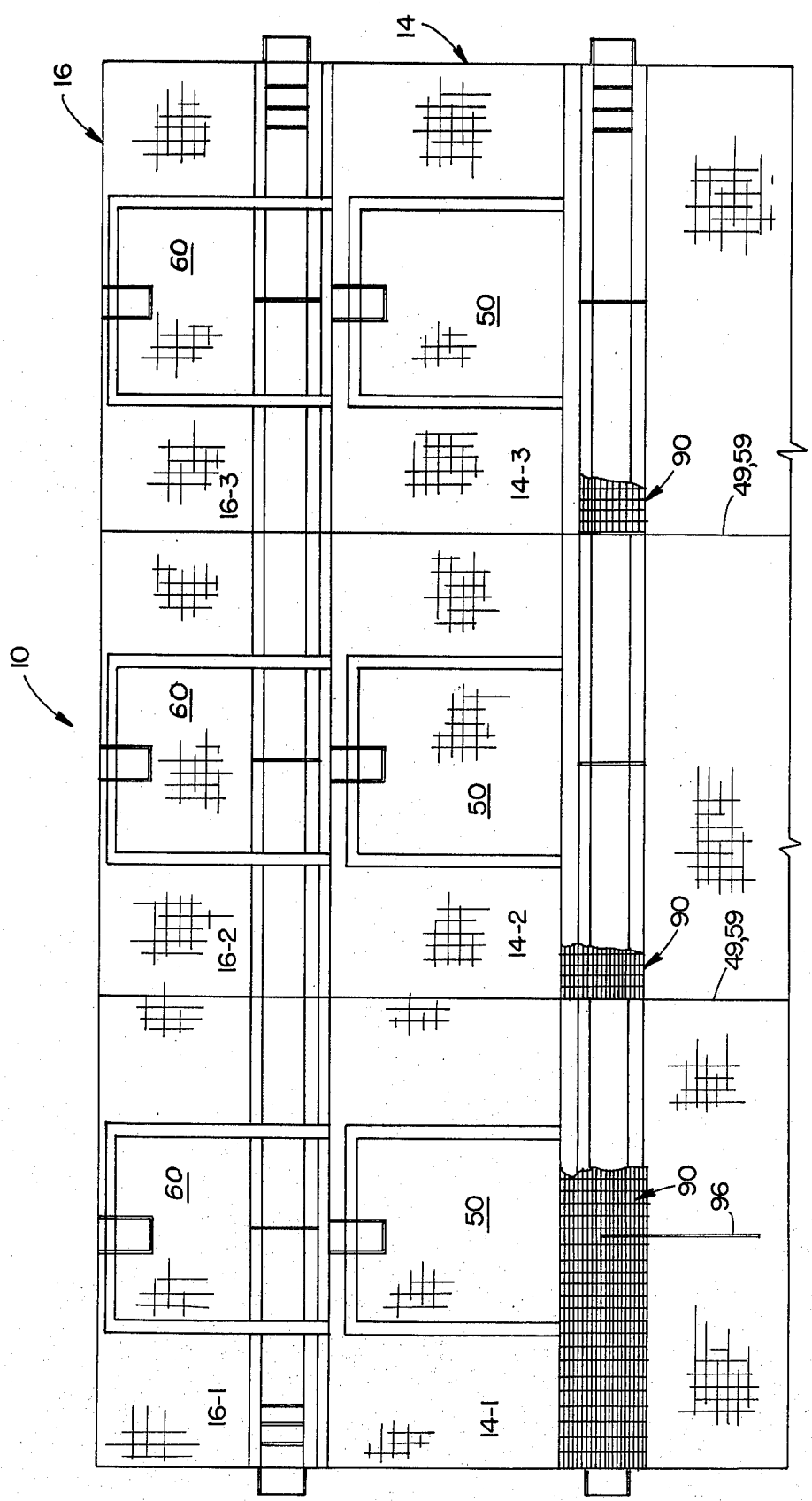
FIG. 3 is a schematic, plan view of the left one-half of the system as viewed in FIG. 1, the right half being symmetrical thereto.

Referring initially to FIGS. 1–3, the cage system 10 which is the subject of this invention includes longitudinally spaced support structures 12 carrying thereon upper, back-to-back cage rows 14 and 14' and lower, laterally spaced cage rows 16 and 16'. The overall width of the system—i.e., the distance between legs 24 and 24', to be discussed hereinafter, is preferably eight feet, rendering the system suitable for use when suspended over a manure pit of similar width.

The longitudinally spaced support structures 12 include a lower, horizontal beam 22 supported at either extremity by end legs 24 and 24'. The end legs have welded thereto reinforcement blocks 26 and 26', it being preferred that the legs mount to the extremity of beam 22 in bayonet-type fashion. Supports 28 and 28' depend from horizontal beam 22. Central supports 32 and 32', vertically aligned with supports 28 and 28', respectively, extend upwardly from lower beam 22 and support upper, horizontal beam 34. Lateral or non-scissoring stability is provided by a reinforcement truss rod 36 suitably welded to beam 22 and the lower extremities of supports 28 and 28'.

Support structure 12, with the exception of the legs 24, is preferably a weldment formed from suitable channel or angle iron and rod. It is designed for use in conjunction with cages having a height of fourteen inches, a width of thirty-two inches and, as will be noted hereinafter, a length of twenty-four or thirty-two inches. The support structures 12 are placed at eight-foot intervals along the cage row. There will be suspended therebetween, thus, twelve individual thirty-two inch cages eight of which are (illustrated as 14-1, 14-2, 14-3, 14'-1, 16-1, 16-2, 16-3 and 16'1) or sixteen individual twenty-four inch cages.

Upper cage rows 14 and 14' include tops 42 and 42', faces 44 and 44', bottoms 46 and 46', a central partition 48 and longitudinal dividers or ends 49 and 49' (not shown). The cages are formed, preferably, from welded wire fabric having approximately one-inch openings. The cages may be fabricated in accordance with any of several methods which are well known in the art. Access to each is provided by means of doors 50 and 50' (not shown) in the upper surfaces 42 and 42', the doors being swingable upwardly to open in conventional fashion.

The lower, laterally spaced cage rows 16 and 16' are fabricated from the same type of wire fabric in similar fashion and include tops 52 and 52', faces 54 and 54', bottoms 56 and 56' and separate, spaced sidewalls 58 and 58'. Individual cages are divided longitudinally by dividers or ends 59 and 59' (not shown). Access to the cages is provided through doors 60 and 60' (not shown) in upper surfaces 52 and 52', respectively, these doors being identical or similar to doors 50 and 50' in cage rows 14 and 14'.

It will be noted, from an examination of FIG. 1, that upper cage row 14 overlies lower cage row 16 for approximately half of its width. Upper cage row 14', similarly, overlies lower cage row 16' for approximately one-half of its width. This leaves a space of approximately thirty-two inches between sidewalls 58 and 58', rendering it possible, as will be noted in detail hereinafter, to position lower feed troughs 64 and 64' in laterally offset position relative to upper cage rows 14 and 14'. Manure from the birds in the upper cage rows, thus, will not fall into feed troughs 64 and 64'.

The one-half overlapping of the cages permits, additionally, provision of access doors 50, 50', 60 and 60' for all individual cages in the upper surfaces thereof. This permits the retrieval of birds from the lower cages without the necessity of crawling or nearly crawling into the cage as has been required in certain of the prior art cage systems having the bottom cage row doors on the front faces 54 and 54'.

Positioned centrally within and running along the bottom of upper cage rows 14 and 14' are upper feed troughs 62 and 62'. Lower feed troughs 64 and 64', similarly, are disposed centrally within and run along the bottom of lower cage rows 16 and 16', respectively. The feed troughs may incorporate conventional antiroost devices 66 and a plastic spillage insert 68 if desired, both being well known to those skilled in the art.

While not shown, the feed troughs 62, 62', 64 and 64' are supplied with feed by any well-known, automated feeding mechanism, such as a conventional chain conveyor running within the bottom of the feed troughs. Examples of such chain conveyors and the means for driving the same are found in U.S. Pat. No. 3,444,986, to VanHuis; U.S. Pat. No. Re. 27,035, to VanHuis; and, U.S. Pat. No. 3,124,104, to Carpenter. Provision is also made to water the birds within the cage, in any conventional manner, and is not shown.

The troughs 62, 62', 64 and 64' are formed from relatively heavy metal, such as sixteen or eighteen gage, cold rolled steel. The metal thickness, in conjunction with the cross-sectional shape of the trough, permits the same to be structural in nature and bear a good deal of the weight between support structures 12, which would otherwise have to be accommodated by a heavier cage, more closely spaced support structures and/or structural reinforcement of some other nature.

Figure 4:
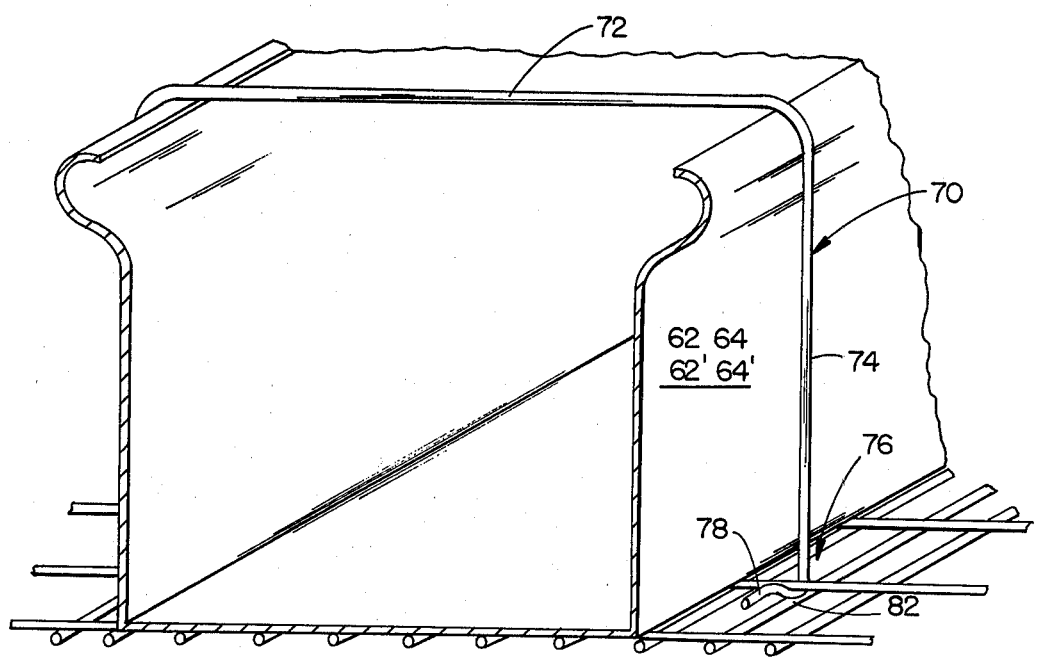
FIG. 4 is a fragmentary perspective illustrating the manner in which the feed troughs structurally stabilize the system.

Cage load is transferred to the troughs by a series of cage support members 70 (see FIG. 4). Each member 70 includes a bite section 72 having a pair of legs 74 depending therefrom. The legs 74 terminate in a resilient cage engaging extremity 76 bounded on the exterior by an upwardly curved cam section 78 and containing a keeper section 82 within which the wire of the cage nests. The leg and keeper section not shown in FIG. 4 is identical to that shown.

The support members 70 are utilized at suitable intervals (preferably sixteen-inch centers) in all four cage rows. The members 70 function, as will be readily apparent to those skilled in the art, to transfer load placed on the cages by the birds contained therein to the feed troughs. The feed troughs, in turn, transmit the load to the spaced support structures 12.

Figure 5:
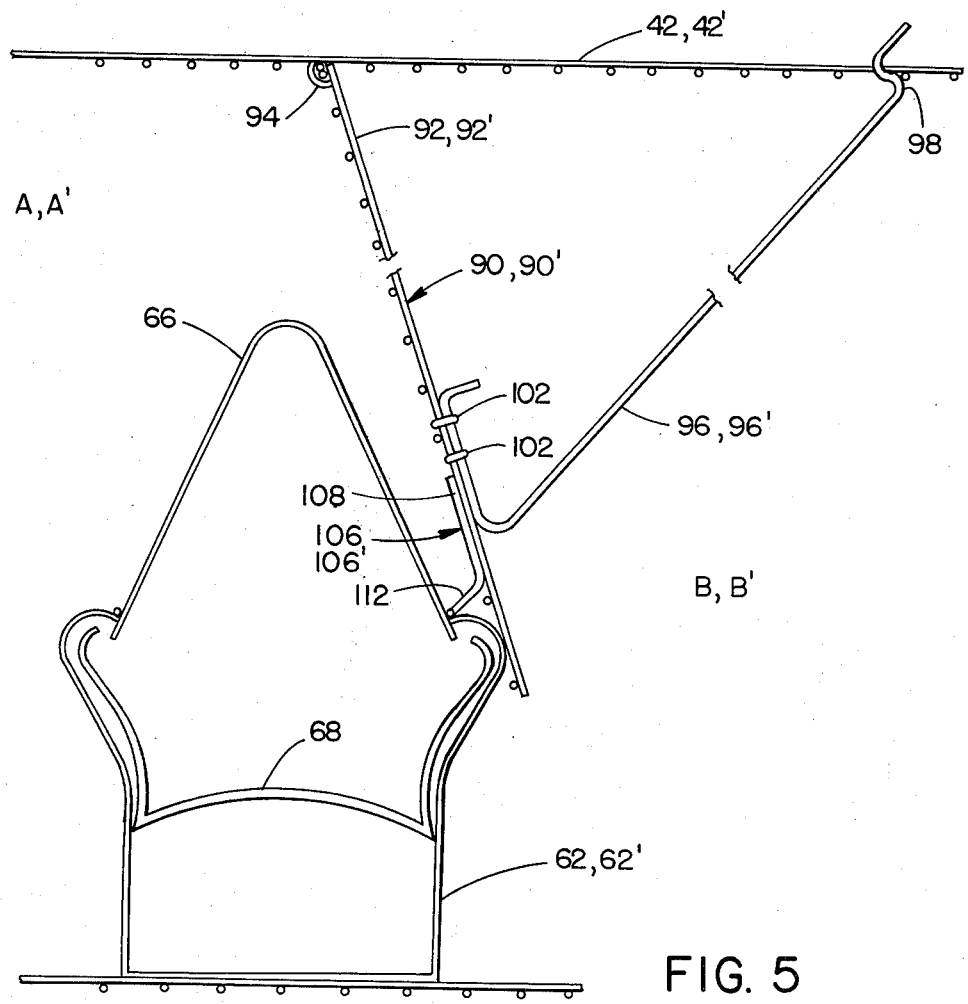
FIG. 5 is a fragmentary, cross-sectional view illustrating the barrier and feed saver assembly.

Referring additionally to FIG. 5, each of the upper cages 14 and 14' contains a barrier and feed saver assembly 90 and 90', respectively. This assembly includes an elongated, rectangular barrier 92, 92' fabricated preferably from the same mesh material as that utilized in the construction of the cages. The rectangular barrier is pivotally attached to the top of the cage by hog rings or other suitable attachments as at 94 and extends the entire length of the cage. It is swingable from the position shown in FIG. 1 upwardly into close adjacency with the tops 42 and 42' of the upper cages. Position is controlled by means of one or more control rods 96 and 96', which are formed, preferably, from wire. Rods 96 include an upper, offset section 98 engageable with one of the longitudinal wires in the cage tops 42 and 42'. Such engagement, as will be readily apparent to those skilled in the art, prevents the barrier from swinging away from the feed trough should it be pressured to do so by the chicks. The lower end of the rod turns upwardly at an acute angle and is pivotally attached to barriers 92, 92' by rings 102. When barriers 92, 92' are swung upwardly into abutment with the top of the cage, rings 102 permit rods 96, 96' to be pivoted (into and out of the paper as shown in FIG. 5) so that extremity 98 can be tucked into the cage wire to retain the barrier in raised, non-functional position.

The barrier, as described to this point, is similar to that utilized previously in the FLAT DECK CHIK-EZE cage referred to in the Background to this specification. A salient feature of the present invention includes the attachment of elongated, imperforate feed savers 106, 106' to the depending sections of barriers 92, 92', respectively. Feed savers 106, 106' include a planar section 108 having an angular lip 112 adapted to nest slightly within the feed trough and abut the antiroost devices. The purpose of these components will become apparent in the ensuing paragraphs which explain the operation of the cage system which is the subject of this invention.

When it is desired to load the cages with chicks initially, the barrier and feed saver assemblies 90 and 90' are locked in the position shown in FIGS. 1 and 5. This effectively divides the interior of each of the cages in the upper rows 14 and 14' into compartments A and A', within which the chicks will stay initially, and compartments B and B', which will be empty initially. Paper or other material is then placed on the floor of compartments A, A' to aid the footing of the very small birds.

During or prior to this period, the automated feeder chain has been running within troughs 62 and 62', and the same will be filled to a level slightly below that of the insert 68. Once it has filled the troughs to this level, it is stopped and, typically, not restarted until after the birds have been debeaked.

Operating personnel will then take a bucket, can or other container filled with feed and purposely overfill the feed trough, throwing and piling the feed against imperforate feed savers 106, 106'. The presence of this imperforate member, as will be obvious, markedly assists in this piling process, since the feed may be more or less thrown against it until it nearly overflows the opposite side of the trough. This amount of feed will be sufficient to sustain the birds during their first approximate ten days. At this point in maturity, it is safe to again run the automated feed chain and, most importantly, it will not have been necessary in the interim to continue to hand fill the feed trough.

Once the trough has been filled, fifty chicks are inserted into each of the compartments A and A' through access doors 50 and 50', respectively (assuming thirty-two inch cages). The sizing of the cages as to height, length and width (fourteen, thirty-two and thirty-two inches) permits this number of birds to be accommodated with optimum heat retention and minimum overcrowding. It also renders unnecessary counting of the chicks when they are placed in the cage, since the same come in boxes of one hundred divided into groups of twenty-five.

The birds remain in compartments A and A' for approximately ten days. During this period, they feed from the heaped troughs. The feed savers 106 and 106' function, during this period, to retard spillage of food from compartments A and A' into compartments B and B'. This spillage, which has occurred previously when birds pushed the food out of the trough while eating, would otherwise result in feed dropping through the bottom of compartments B and B' and into the manure pit. The birds, as noted previously, are watered during this and subsequent periods in any conventional fashion.

At the end of approximately ten days, twenty-five of the birds are removed from compartment A, debeaked and placed into the cage 16 or 16' immediately below the cage from which they were removed. The remaining twenty-five birds in the upper cage are also debeaked, the paper removed and the barrier and feed saver assemblies 90 or 90' retracted so that these twenty-five birds can use the complete interior of the upper cages.

The birds, during the ensuing weeks, are fed automatically as discussed previously. Their ability to gain access to the feed trough from either side encourages them to eat and, thus, gain weight rapidly. Droppings from birds in the upper rows of cages will not fall into lower feed trough 64 and 64' because of the lateral offset previously discussed. The cage interiors are light and well ventilated, promoting healthy bird growth. Once the chicks have matured (approximately twenty weeks), they can be removed to layer cages or the like and a new batch of chicks started.

While a preferred embodiment of this invention has been described in detail, it will be readily apparent to those skilled in the art that other embodiments may be conceived and fabricated without departing from the spirit and scope of this invention. Such other embodiments are to be deemed included within the scope of the appended claims, unless these claims, by their language, expressly state otherwise.

The embodiments of the invention in which an exclusive property or privilege is claimed are defined as follows:

1. A poultry cage system comprising:
   first and second upper rows of cages extending generally parallel to and positioned adjacent one another in back-to-back fashion;
   first and second lower rows of cages positioned immediately below and extending generally parallel to said upper rows of cages, said lower cages being spaced from one another, each underlying one of said upper rows of cages for approximately one-half of its width, the top of the other half of each of said lower rows of cages being substantially unobstructed;
   a feed trough positioned within and extending lengthwise of each of said lower rows of cages, each of said troughs being offset laterally from said upper rows of cages but positioned generally centrally within said lower rows of cages such that droppings from said upper rows of cages will not fall into said feed troughs but birds may feed from either side thereof; and
   means to support said cage system above the floor.

2. The system as set forth in claim 1 which further comprises an access door for each of the cages in each of said rows, the doors for said lower rows of cages being positioned in the unobstructed one-half of the tops thereof.

3. The system as set forth in claim 2 wherein the access doors for said upper rows of cages are positioned on the tops and adjacent the faces thereof.

4. The system as set forth in claim 2 wherein the access doors for said upper rows of cages are positioned on the tops and adjacent the faces thereof.

5. The system as set forth in claim 1 wherein said upper rows of cages also have feed troughs positioned generally centrally therewithin and extending therealong, said upper and lower feed troughs forming a part of said support means.

6. The system as set forth in claim 5 wherein said support means further comprises:
 a series of longitudinally spaced support structures having vertically spaced, horizontal support members upon which said upper and lower rows of cages and the feed troughs contained therein rest; and
 means interconnecting said troughs and the floors of the cages within which they are positioned intermediate said support structures, said interconnecting means transferring weight from said floors to said troughs, said troughs thereafter transferring said weight to said support structures.

7. The system as set forth in claim 1 which further comprises a feed trough extending along the bottom and spaced from either side of each of said upper rows of cages; a barrier positioned within at least some of the cages in said upper rows, said barrier being movable between a first position whereat the interior of the cage is substantially unobstructed and poultry contained therein are free to move throughout the entire cage, and a second position whereat the interior of the cage is divided into two sections, the barrier in said second position confining poultry contained within the cage to one side thereof containing said feed trough; and a substantially imperforate feed saver affixed to said barrier and extending substantially coextensive therewith, said feed saver abutting that side of said trough remote from said one side of said cage and extending upwardly therefrom when said barrier is in said second position to retard the spillage of food contained in said trough over said remote side of said trough.

8. The system as set forth in claim 7 wherein said barrier is pivotally attached to the top of the cages within which it is positioned and pivotal from said second position upwardly to said first position whereat it lies adjacent and generally parallel to said top.

9. The system as set forth in claim 8 which further comprises means for retaining said barrier in either of said first or second positions.

10. The system as set forth in claim 7 which further comprises an access door for each of the cages in each of said rows, the doors for said lower rows of cages being positioned in the unobstructed one-half of the tops thereof.

11. In a poultry cage particularly adapted for the rearing of chicks having a feed trough extending along the bottom and spaced from either side thereof; a barrier movable between a first position whereat the interior of the cage is substantially unobstructed and poultry contained therein are free to move throughout the entire cage, and a second position whereat the interior of the cage is divided into two sections, the barrier in said second position confining poultry contained within the cage to one side thereof containing said feed trough, the improvement comprising a substantially imperforate feed saver affixed to said barrier and extending substantially coextensive therewith, said feed saver abutting that side of said trough remote from said one side of said cage and extending upwardly therefrom when said barrier is in said second position to retard the spillage of food contained in said trough over said remote side of said trough and to permit overfilling of said trough without appreciable spillage therefrom.

12. The cage as set forth in claim 11 wherein said barrier is pivotally attached to the top thereof and pivotal from said second position upwardly to said first position whereat it lies adjacent and generally parallel to said top.

13. The cage as set forth in claim 12 which further comprises means for retaining said barrier in either of said first or second positions.

* * * * *